Oct. 3, 1950 R. J. IFIELD ET AL 2,524,445
MEANS FOR CONTROLLING THE TEMPERATURE OF HOT GASES
Filed Oct. 15, 1948
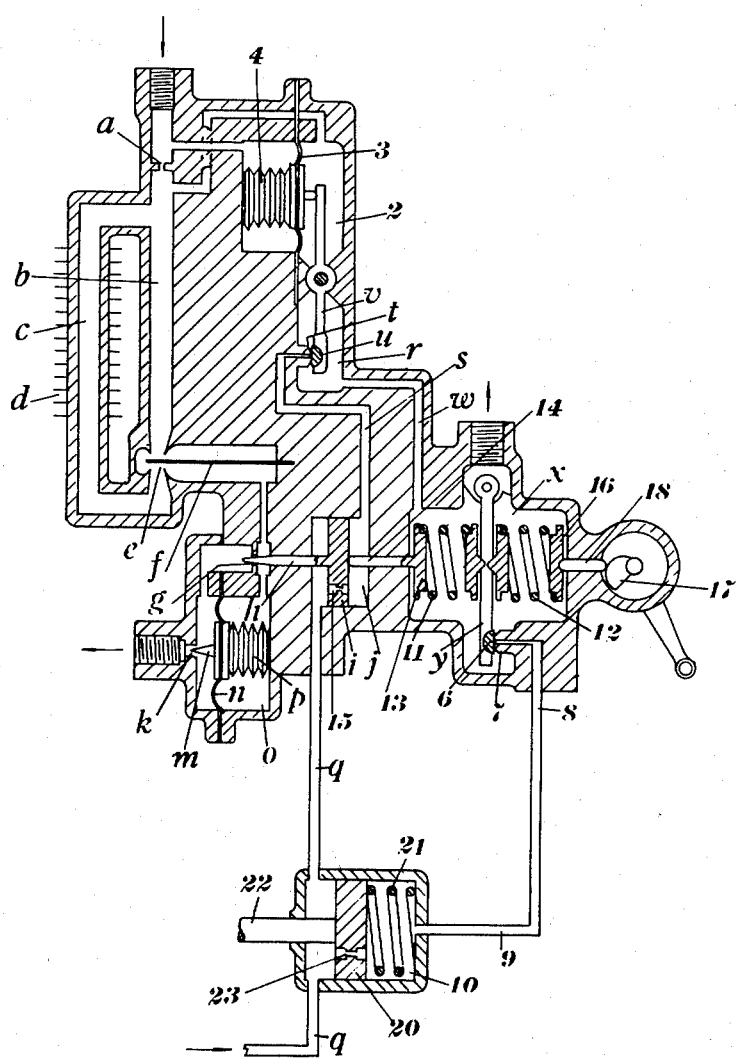
Inventors
R. J. Ifield
J. J. Righton Patented Oct. 3, 1950

2,524,445

UNITED STATES PATENT OFFICE 2,524,445

MEANS FOR CONTROLLING THE TEMPERATURE OF HOT GASES

Richard Joseph Ifield, Dural, New South Wales, Australia, and Joseph John Righton, Acocks Green, England, assignors to Joseph Lucas Limited, Birmingham, England Application October 15, 1948, Serial No. 54,754
In Great Britain October 16, 1947

5 Claims. (Cl. 236—79)

This invention has for its object to provide improved means for controlling the temperature of hot gases, and particularly of the hot gases produced in the combustion chambers of internal combustion turbines, jet-propulsion prime movers, furnaces and the like.

The invention comprises an apparatus having in combination, a first orifice of fixed area, a second orifice of variable area arranged in series with the first orifice, a gas cooling means between the said orifices, a third orifice of variable area in series with the second orifice, a spring-loaded and fluid operated mechanism under the control of the pressure difference across the first orifice for varying the effective area of the second orifice, means responsive to the pressure difference across the second orifice for varying the third orifice, and means responsive to the said mechanism for controlling the temperature of the gas entering the first orifice.

The accompanying drawing illustrates diagrammatically one embodiment of the invention for controlling the temperature in the combustion chamber of a jet-propulsion prime mover, or an internal combustion turbine, the control being effected by variation of the rate of supply of liquid fuel to the said chamber.

Referring to the drawing we employ an apparatus which at its inlet end is provided with a small orifice $a$ of appropriate fixed area and adapted to receive through a pipe a small quantity of hot gas from the combustion chamber. This orifice discharges into a pair of passages $b$, $c$ connected in parallel with each other, and the passage $c$ is adapted to be cooled by any convenient means (as indicated for example by the fins $d$). At the meeting position of the two streams flowing through these passages is arranged a mixing valve $e$ under the control of a bi-metal strip $f$ or other temperature-responsive means, the mixed gases being kept at a constant temperature by variation (under the control of the strip $f$) of the relative proportions of the hot and cooled gas streams. Beyond the mixing valve is arranged a second orifice $g$ the effective area of which is variable by an axially arranged conical or like slidable plug $h$, this latter being formed on or connected to a piston $i$ slidable in a cylinder $j$ and forming part of a servo-mechanism. Also beyond the second orifice is arranged a third variable orifice $k$ through which the effluent gas can be discharged to atmosphere or elsewhere. For varying the effective area of the third orifice it is provided with an axially arranged slidable plug $m$ of conical or other form connected to a flexible diaphragm $n$ which divides an associated chamber $o$ into two compartments which are respectively in communication with the entrance and exit sides of the second orifice. Also the diaphragm is loaded by an evacuated elastic capsule $p$ contained in the compartment which communicates with the entrance side of the second orifice.

One end of the cylinder $j$ is adapted to be supplied with pressure fluid by a pipe $q$ connected to any convenient source, which may be the delivery pipe of the pump used for supplying fuel oil to the combustion chamber. The other end of this cylinder communicates with a chamber $r$ by way of a passage $s$ which terminates in a seating $t$ for a closure member $u$ on a lever $v$, and this chamber communicates by way of a passage $w$ with another chamber $x$ containing a valve lever $y$ which is movable in response to the piston $i$ as hereinafter described.

The lever $v$ extends through a wall or partition into another chamber 2 which is divided into two compartments by a flexible diaphragm 3, the latter being loaded on one side by an evacuated elastic capsule 4, and the compartment which contains the capsule being in communication with the entrance side of the first orifice $a$, the compartment containing the end of the lever which co-operates with the diaphragm being in communication with the exit side of the said orifice $a$.

As already mentioned the apparatus at present being described is intended to control the temperature in the combustion chamber by varying the rate of supply of fuel oil to the chamber. For this purpose a variable delivery fuel pump is used, and the pump is such that variation of its output is effected by fluid operated means. In this case the valve lever $y$ above mentioned which is responsive to movement of the piston $i$ has at one end a closure member 6 which co-operates with a seating 7 around a passage 8 which opens into the chamber $x$ containing the lever and which communicates with a pipe 9 leading to one end of a cylinder 10 forming part of the pump controlling means. The chamber $x$ is also provided with an outlet leading to a sump or the suction side of the fuel pump. The lever $y$ is loaded at its opposite sides by a pair of springs 11, 12, and one of these springs is carried by a movable support 13 from which a stem 14 extends through a wall of the chamber $x$ to the piston $i$. Also the piston $i$ is formed with a restricted orifice 15 (or alternatively the cylinder wall is formed with a passage having a restricted orifice, for establishing communications between the two ends of the cylinder $j$. Further, the other spring 12 is supported at one end by a movable part 16 which is adjustable by a manually operable cam 17 (acting on a stem 18) or other means for adjustment of the pressure exerted by the spring 12 on the lever $y$.

By means of the mixing valve $e$ the temperature of the gas flowing through the second orifice $g$ is kept substantially constant, and the increase or decrease of the effective area of this orifice is effected by movement of the piston $i$ in response to actuation of the valve lever $v$ by the pressure responsive device associated with the first orifice.

The means employed (in the example illustrated by the drawing) for controlling the fuel pump output, comprises a piston 20 in the cylinder 10. At one side of this piston is arranged a spring 21, and from the opposite side of the piston extends a rod 22 which actuates the output-controlling means of the pump. In the piston (or in a by-pass passage in the cylinder 10) is provided a restricted orifice 23. The arrangement is such that with the closure member 6 closed on its seating 7, no flow occurs through the orifice 23 and the piston 20 is then moved by the spring 21 towards one of its limits of movement. When the closure member 6 is moved off its seating, flow is established, and due to the fluid pressure difference at the opposite sides of the piston 20 the latter is moved in the opposite direction in opposition to the spring 21.

The mode of action of the apparatus is as follows:

In a given state of equilibrium motive fluid flows at an appropriate rate through the passages controlled by the levers $v$, $y$. With an increase of the temperature in the combustion chamber, the pressure difference across the orifice $a$ will thereby be correspondingly increased. This will result in movement of the lever $v$ in the direction for restricting the flow of motive fluid along the pipe $q$ causing the piston $i$ to be moved by the resulting increase of pressure in the cylinder $j$ in the direction for restricting the orifice $g$. This movement will also cause the spring 12 to move the lever $y$ in the direction for increasing the flow through the pipe 9, causing the piston 20 to be moved by the motive fluid to the right for restricting the pump output.

As a consequence of the restriction of the orifice $g$ by the piston $i$ there results an increase of the pressure difference across the said orifice, causing the plug $m$ to restrict the orifice $k$ and thereby restore the required normal pressure difference across the orifice $g$.

The invention is not, however, restricted to the example above described. Thus, instead of the servo-mechanism causing the rate of delivery of the fuel pump to be varied it may vary a by-pass device whereby some of the fuel supplied by the pump is diverted to a sump or is returned to the suction side of the pump. Alternatively it may actuate a throttle valve in the fuel supply pipe, or it may control an inflow of air to the hot gases. Moreover, the invention is not limited to the particular use above specified, as it may be applied to other analogous uses, wherein the temperature of hot gas is required to be kept substantially constant at a selected value.

Having thus described our invention what we claim as new and desire to secure by Letters Patent is:

1. In means for controlling the temperature of hot gases, the combination of a first orifice of fixed area, a second orifice of variable area arranged in series with the first orifice, a gas cooling means between the said orifices, a third orifice of variable area in series with the second orifice, a spring-loaded and fluid operated mechanism under the control of the pressure difference across the first orifice for varying the effective area of the second orifice, means responsive to the pressure difference across the second orifice for varying the third orifice, and means responsive to the said mechanism for controlling the temperature of the gas entering the first orifice.

2. Means as claimed in claim 1 and having between the first and second orifices a pair of passages connected in parallel, one of the passages having the gas cooling means associated therewith a mixing valve at the junction of the said passages adjacent to the second orifice, and a temperature responsive device for regulating the valve.

3. Means as claimed in claim 1 and having a motive-fluid valve lever responsive to the pressure difference across the second orifice for controlling the spring-loaded and fluid operated mechanism.

4. In means as claimed in claim 1, a spring-loaded piston and plug operable by motive fluid and forming parts of the spring-loaded and fluid operable mechanism for varying the effective area of the second orifice, and a motive-fluid valve lever responsive to the pressure difference across the first orifice for controlling the effect of the motive fluid on the said piston and plug.

5. In means as claimed in claim 1, a spring-loaded piston and plug operable by motive fluid and forming parts of the spring-loaded and fluid operated mechanism for varying the effective area of the second orifice, a motive-fluid valve lever responsive to the pressure difference across the first orifice for controlling the effect of the motive fluid on the said piston and plug, a second spring-loaded piston operable by the motive fluid, and a second valve lever associated with the first mentioned piston for controlling the effect of the motive fluid on the second piston.

RICHARD JOSEPH IFIELD.
JOSEPH JOHN RIGHTON.

REFERENCES CITED

The following references are of record in the file of this patent:

UNITED STATES PATENTS

| Number | Name | Date |
| --- | --- | --- |
| Re. 11,413 | Uehling et al. | Apr. 17, 1894 |
| 1,630,318 | Tate | May 31, 1927 |